US010170784B2

(12) United States Patent
Sone

(10) Patent No.: US 10,170,784 B2
(45) Date of Patent: Jan. 1, 2019

(54) REGENERATIVE FUEL CELL SYSTEM

(71) Applicant: Japan Aerospace Exploration Agency, Tokyo (JP)

(72) Inventor: Yoshitsugu Sone, Hachioji (JP)

(73) Assignee: Japan Aerospace Exploration Agency, Tokyo (JP)

( * ) Notice: Subject to any disclaimer, the term of this patent is extended or adjusted under 35 U.S.C. 154(b) by 728 days.

(21) Appl. No.: 14/042,610

(22) Filed: Sep. 30, 2013

(65) Prior Publication Data

US 2014/0093795 A1   Apr. 3, 2014

(30) Foreign Application Priority Data

Oct. 1, 2012   (JP) .................................. 2012-219780

(51) Int. Cl.
| H01M 8/04 | (2016.01) |
| H01M 8/18 | (2006.01) |
| H01M 8/04119 | (2016.01) |
| H01M 16/00 | (2006.01) |

(52) U.S. Cl.
CPC ....... *H01M 8/186* (2013.01); *H01M 8/04156* (2013.01); *H01M 16/00* (2013.01); *H01M 16/003* (2013.01); *Y02E 60/366* (2013.01); *Y02E 60/528* (2013.01)

(58) Field of Classification Search
CPC ............................... H01M 6/00; H01M 6/003
USPC .................................................. 429/413, 418
See application file for complete search history.

(56) References Cited

U.S. PATENT DOCUMENTS

| 5,277,994 A  *  | 1/1994  | Sprouse ............. H01M 8/04119 |
| | | 204/DIG. 4 |
| 2003/0068544 A1 | 4/2003 | Cisar et al. |
| 2003/0198851 A1 | 10/2003 | Sone et al. |
| 2007/0231643 A1* | 10/2007 | Yamaga ............. H01M 8/04014 |
| | | 429/431 |
| 2007/0259231 A1 | 11/2007 | Sone et al. |
| 2008/0166603 A1 | 7/2008 | Hibbs et al. |
| 2011/0159383 A1 | 6/2011 | Sone et al. |
| 2011/0302909 A1* | 12/2011 | Botte ....................... C25B 1/00 |
| | | 60/274 |

(Continued)

FOREIGN PATENT DOCUMENTS

| JP | H 06-036785 | 2/1994 |
| JP | H 08-037013 | 2/1996 |

(Continued)

*Primary Examiner* — Stewart A Fraser
*Assistant Examiner* — Rachel L Zhang
(74) *Attorney, Agent, or Firm* — McDermott Will & Emery LLP

(57) ABSTRACT

The reservoirs 2 and 2' preliminarily contain liquid water, which is utilized as the water to be supplied to the polymer membrane. A vapor pressure of the water is set to a predetermined value in the reservoir by controlling the temperature of the reservoirs 2 and 2' individually. Pressure gauges 6 and 6' may be used for setting a vapor pressure of the water. The water which is gasified based on the set vapor pressure in the respective reservoir is supplied to the stack 10 along with oxygen from the reservoir 2, and with hydrogen from the reservoir 2'. This configuration makes it possible to adjust the amount of water contained in the polymer membrane and maintain the moisturization of the polymer membrane without external water supply.

12 Claims, 4 Drawing Sheets

(56) References Cited

U.S. PATENT DOCUMENTS

| | | | | |
|---|---|---|---|---|
| 2013/0146448 A1* | 6/2013 | Wang | ............... | C25B 3/04 |
| | | | | 204/252 |
| 2014/0072836 A1* | 3/2014 | Mills | ............... | C25B 1/04 |
| | | | | 429/8 |

FOREIGN PATENT DOCUMENTS

| | | | |
|---|---|---|---|
| JP | 2001-130901 | A | 5/2001 |
| JP | 2001-338672 | A | 12/2001 |
| JP | 2003-089891 | A | 3/2003 |
| JP | 2003-105577 | A | 4/2003 |
| JP | 2006-127807 | A | 5/2006 |
| JP | 2007-100204 | A | 4/2007 |
| JP | 2007-115588 | A | 5/2007 |
| JP | 4013218 | B2 | 11/2007 |
| JP | 2009-138253 | A | 6/2009 |
| JP | 2010-067454 | A | 3/2010 |
| JP | 2014-072119 | A | 4/2014 |
| WO | WO 2012/138576 | * | 10/2012 |

* cited by examiner

REGENERATIVE FUEL CELL SYSTEM

CROSS-REFERENCES TO RELATED APPLICATION

This application claims priority to and the benefit of Japanese Patent Application No. 2012-219780 filed in the Japanese Patent Office on Oct. 1, 2012, the entire contents of which are incorporated herein by reference.

TECHNICAL FIELD

The present invention relates to a regenerative fuel cell system using oxygen and hydrogen, and having a power storage function.

BACKGROUND

FIG. 4 is an illustration for explaining a power generation mechanism and charging (power storage) mechanism of a regenerative fuel cell system using hydrogen and oxygen. FIG. 4(a) is referred to as a separate type in which a fuel cell section and a water electrolysis section are provided in a separated manner, while FIG. 4(b) is referred to as a unitized type (or "a reversible type") in which a fuel cell section and a water electrolysis section are provided in an integrated manner.

In the fuel cell system in FIG. 4(a), water is electrolyzed into a hydrogen gas and an oxygen gas in the water electrolysis section during a charging (power storage) time. Each of the resulting hydrogen gas and oxygen gas are stored in a respective tank. During a power generation time, the hydrogen gas and oxygen gas stored in the respective tank are reacted in the fuel cell section to generate electric power. Water obtained at that time is stored in a dedicated tank. In the fuel cell system in FIG. 4(b), the reactions during the charging (power storage) time and the power generation time are performed in a similar fashion, but are different from those of FIG. 4(a) in that the both reactions are performed in a unitized fuel cell section.

During the time of electrolysis of water, an electrode is required to contain moisture, while during the power generation time, it is required to be dried. Therefore, a generic regenerative fuel cell system often employs the separate type as illustrated in FIG. 4(a). On the other hand, in the case where a severe limitation is imposed on weight, such as in a space application, the unitized type has an advantage from the view point of effectiveness against mass.

Further, during a power generation time, a proton ($H^+$) (or hydrogen ion) that is separated from an electron is required to be transported through a polymer membrane to the other side thereof, for which the polymer membrane is required to be moisturized by containing moisture. To satisfy the above demand, the Applicant has proposed to allow the polymer membrane to be appropriately moisturized by flowing the oxygen gas and the hydrogen gas from each of the opposite sides of the polymer membrane to the other side thereof with respect to each other (Patent Document 1). Examples of the fuel cell system in which a fuel cell section and a water electrolysis section are provided in an integrated manner can also be found in Patent Documents 2 and 3.

LIST OF PRIOR ART DOCUMENTS

Patent Document 1: JP 4013218B
Patent Document 2: JP 2006-127807A
Patent Document 3: JP 2007-115588A

SUMMARY

In the case of using a fuel cell system especially in a space application, there exists a demand for reusing the resources such as an oxygen gas as much as possible without elimination thereof to the outside. If this is realized, it is possible to reduce the wasteful consumption of resources such as hydrogen gas and oxygen gas, so that many advantages are provided not only in space application but also on the earth. Thus, a closed fuel cell system which enables reuse of the hydrogen gas, oxygen gas and water with no elimination thereof to the outside is under consideration. In this case, it is an important problem how the polymer membrane is to be moisturized during the time of power generation.

To solve the above problem, the present invention provides a regenerative fuel cell system comprising a combination of fuel cell and water electrolyzer consisting of a polymer membrane and electrodes each provided on either side of the polymer membrane, wherein the regenerative fuel cell system is operable to generate electric power during a power generation time by supplying an oxygen gas to an electrode provided on one side of the polymer membrane and by supplying a hydrogen gas to an electrode provided on the other side of the polymer membrane, and to generate an oxygen gas and a hydrogen gas during a charging time by electrolyzing water in the combination of fuel cell and water electrolyzer, the regenerative fuel cell system comprising: an oxygen tank for storing an oxygen gas; a hydrogen tank for storing a hydrogen gas; a first reservoir for storing water and an oxygen gas that is not used for power generation out of the oxygen gas supplied during the power generation time; a second reservoir for storing water and a hydrogen gas that is not used for power generation out of the hydrogen gas supplied during the power generation time; and vapor pressure control means for controlling a vapor pressure of the water in at least one of the first reservoir and the second reservoir, wherein the combination of fuel cell and water electrolyzer, the oxygen tank, the hydrogen tank, the first reservoir, the second reservoir, and a liquid/gas path for connecting them are provided as a closed path, the oxygen tank and the first reservoir are connected with each other to allow the oxygen gas to travel back and forth therebetween, and the oxygen gas is supplied to the electrode provided on one side of the polymer membrane during the power generation time, the hydrogen tank and the second reservoir are connected with each other to allow the hydrogen gas to travel back and forth therebetween, and the hydrogen gas is supplied to the electrode provided on the other side of the polymer membrane during the power generation time, and wherein water which is required during the power generation time is supplied to the polymer membrane by controlling the vapor pressure of the water by the vapor pressure control means.

In this regenerative fuel cell system, the vapor pressure control means may control the vapor pressure of the water by varying a temperature of the first reservoir and the second reservoir.

The regenerative fuel cell system may comprise a pressure difference gauge for measuring a pressure difference between the oxygen gas on an oxygen side and the hydrogen gas on a hydrogen side of the polymer membrane, and the pressure difference may be controlled within a predetermined range by varying a position of liquid water level (or fluid level) in the first and/or second reservoirs based on the result of the measurement.

The regenerative fuel cell system may comprise a first pressure gauge for measuring a pressure of the oxygen gas in the first reservoir or in the passage on the oxygen side and a second pressure gauge for measuring a pressure of the hydrogen gas in the second reservoir or in the passage on the hydrogen side, and the pressure difference between the oxygen gas on the oxygen side and the hydrogen gas on the hydrogen side may be controlled within a predetermined range by varying a position of liquid water level in the first and/or second reservoirs based on the measured values of the first and second pressure gauges.

The regenerative fuel cell system may comprise a pressure difference gauge for measuring a pressure difference between the oxygen gas on an oxygen side and the hydrogen gas on a hydrogen side of the polymer membrane, and the pressure difference may be controlled within a predetermined range by varying a pressure of the oxygen gas in the first reservoir and/or the hydrogen gas in the second reservoir based on the result of the measurement.

In this regenerative fuel cell system, the combination of fuel cell and water electrolyzer may be formed by providing a fuel cell section and a water electrolysis section in an integrated.

In this regenerative fuel cell system, the combination of fuel cell and water electrolyzer may be formed by providing a fuel cell section and a water electrolysis section in a separated manner.

To solve the above problem, the first invention provides a regenerative fuel cell system comprising a combination of fuel cell and water electrolyzer consisting of a polymer membrane and electrodes each provided on either side of the polymer membrane, wherein the regenerative fuel cell system is operable to generate electric power during a power generation time by supplying an oxygen gas to an electrode provided on one side of the polymer membrane and by supplying a hydrogen gas to an electrode provided on the other side of the polymer membrane, and to generate an oxygen gas and a hydrogen gas during a charging time by electrolyzing water in the combination of fuel cell and water electrolyzer, the regenerative fuel cell system comprising: an oxygen tank for storing an oxygen gas; a hydrogen tank for storing a hydrogen gas; a reservoir for storing water and an oxygen gas that is not used for power generation out of the oxygen gas supplied during the power generation time; and vapor pressure control means for controlling a vapor pressure of the water in the reservoir, wherein the combination of fuel cell and water electrolyzer, the oxygen tank, the hydrogen tank, the reservoir, and a liquid/gas path for connecting them are provided as a closed path, the oxygen tank and the reservoir are connected with each other to allow the oxygen gas to travel back and forth therebetween, and the oxygen gas is supplied to the electrode provided on one side of the polymer membrane, while the hydrogen gas is supplied from the hydrogen tank to the electrode provided on the other side of the polymer membrane during the power generation time, wherein water which is required during the power generation time is supplied to the polymer membrane by controlling the vapor pressure of the water by the vapor pressure control means.

The regenerative fuel cell system may further comprise a gas-liquid separator for separating water and a hydrogen gas that is not used for power generation out of the hydrogen gas supplied during the power generation time, and supplying the separated hydrogen gas to the hydrogen tank, wherein the gas-liquid separator is incorporated in the closed path.

The regenerative fuel cell system further may comprise an oxygen side gas-liquid separator for separating water and an oxygen gas that is not used for power generation out of the oxygen gas supplied during the power generation time, wherein the oxygen side gas-liquid separator is incorporated in the closed path.

In this regenerative fuel cell system, the vapor pressure control means may control the vapor pressure of the water by varying a temperature of the reservoir.

The regenerative fuel cell system may comprise a pressure difference gauge for measuring a pressure difference between the oxygen gas on an oxygen side and the hydrogen gas on a hydrogen side of the polymer membrane, and the pressure difference may be controlled within a predetermined range by varying a position of liquid water level in the reservoir based on the result of the measurement.

The regenerative fuel cell system may comprise a pressure difference gauge for measuring a pressure difference between the oxygen gas on an oxygen side and the hydrogen gas on a hydrogen side of the polymer membrane, and the pressure difference may be controlled within a predetermined range by varying a pressure of the oxygen gas in the reservoir based on the result of the measurement.

The regenerative fuel cell system may comprise a first pressure gauge for measuring a pressure of the oxygen gas in the first reservoir or in the passage on the oxygen side and a second pressure gauge for measuring a pressure of the hydrogen gas in the gas-liquid separator or in the passage on the hydrogen side, and the pressure difference between the oxygen gas on the oxygen side and the hydrogen gas on the hydrogen side may be controlled within a predetermined range by varying a position of liquid water level in the first and/or second reservoirs based on the measured values of the first and second pressure gauges.

In this regenerative fuel cell system, the combination of fuel cell and water electrolyzer may be formed by providing a fuel cell section and a water electrolysis section in an integrated manner.

In this regenerative fuel cell system, the combination of fuel cell and water electrolyzer may be formed by providing a fuel cell section and a water electrolysis section in a separated manner.

The fuel cell system according to the present invention, as described above, may control the vapor pressure of the water in the reservoir to supply appropriate moisture to the polymer membrane. This makes it possible for the fuel cell system to continue its operation even in the situation where the entire cell system is formed as a closed one. Further, the fuel cell system comprises a pressure gauge for measuring a pressure in the tank and/or the reservoir, and actively controls the pressure difference between the pressures generated on both sides of the polymer membrane within a predetermined range by controlling the height of liquid water level in the gas-liquid separator and/or the water storage reservoir to cause a volume change in the gas. This makes it possible to ensure that the oxygen gas and the hydrogen gas are prevented from being mixed with each other.

DETAILED DESCRIPTION

Embodiments of the present invention will now be described with reference to the drawings. It is noted that the embodiments described below merely exemplify one embodiment of the present invention, and the technical scope of the present invention is not limited to the embodiments.

Figure 1:
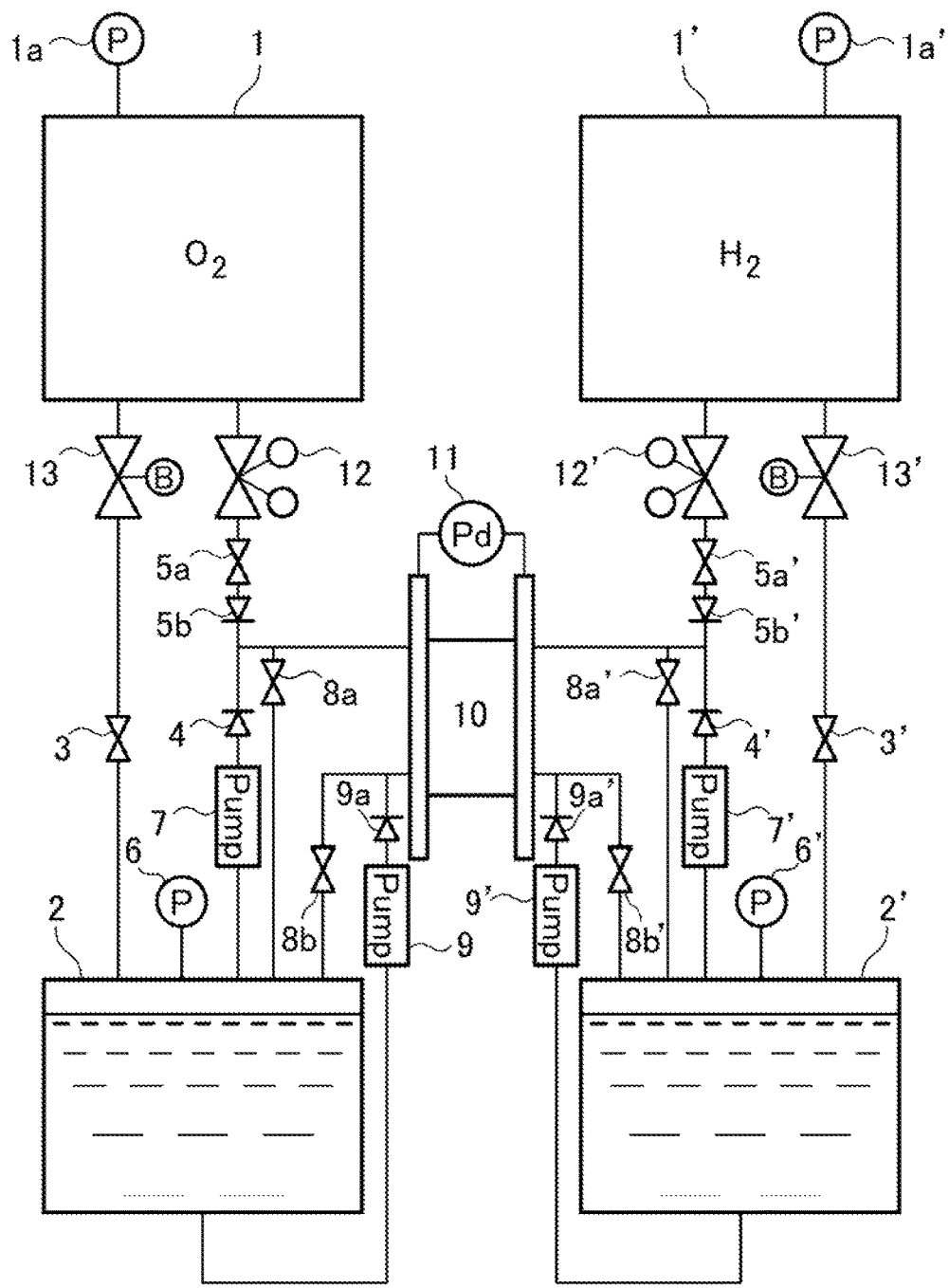
FIG. 1 illustrates a structure of a regenerative fuel cell system according to a first embodiment of the present invention.

FIG. 1 illustrates a schematic structure of a unitized regenerative fuel cell system according to a first embodiment of the present invention. In FIG. 1, only the lines for gas and liquid are illustrated, and electrical circuits such as a load are omitted.

The numeral 10 in FIG. 1 designates a fuel cell/water electrolysis stack (hereinafter, referred to simply as a "stack") which plays a central role of the unitized regenerative fuel cell system, in which a fuel cell section and a water electrolysis section are integrated. The stack 10 has a structure in which a number of unitized cells or reversible cells as the combinations of fuel cell and water electrolyzer (hereinafter, referred to simply as a "cell") are laminated. Each cell comprises a polymer membrane and electrodes each provided on either side thereof, which are laminated in series. As the polymer membrane in each cell, a thin ion-exchange membrane having a thickness of, for example, about 15 to 225 μm may be used. A catalyst for facilitating a reaction is disposed between the polymer membrane and each electrode.

As can be seen from FIG. 1, an oxygen side on the left hand and a hydrogen side on the right hand have a substantially symmetrical structure. Then, among the components in the hydrogen side on the right hand, those corresponding to the components in the oxygen side on the left hand are indicated by the same numerals with a prime (').

In FIG. 1, each of the numerals 1, 1', 2 and 2' designates an oxygen tank, a hydrogen tank, an oxygen side reservoir and a hydrogen side reservoir, respectively. Each of the numerals 1a, 1a', 6 and 6' designates a pressure gauge for measuring a pressure of gas in the respective tank or reservoir, each of the numerals 7, 7', 9 and 9' designates a pump for circulating the gas (oxygen or hydrogen) or water, and the numeral 11 designates a pressure difference gauge for measuring a difference in pressure (pressure difference) between the oxygen side and the hydrogen side. Each of the numerals 4, 4', 5b, 5b', 9a and 9a' designates a check valve. Each of the numerals 3, 3', 5a, 5a', 8a, 8a', 8b and 8b' designates a valve. Then, each of the numerals 12 and 12' designates a regulator, and each of the numerals 13 and 13' designates a back-pressure regulator.

Each of the oxygen tank 1 and the hydrogen tank 1' preliminarily contains a predetermined pressure of oxygen gas and hydrogen gas, respectively. The reservoir 2 preliminarily contains a predetermined pressure of oxygen and a predetermined amount of water (liquid), and the reservoir 2' preliminarily contains a predetermined pressure of hydrogen and a predetermined amount of water (liquid). The stack, the oxygen tank, the hydrogen tank, each reservoir and a liquid/gas path for connecting them, as illustrated in FIG. 1, are provided as a closed path, which does not require any supply of oxygen, hydrogen and water from outside in its normal operation.

In the case of water electrolysis (power storage), a voltage is applied to the electrodes on the oxygen side and on the hydrogen side in each cell where the oxygen side electrode is defined as positive, while the hydrogen side electrode is defined as negative. Then, water is supplied from the reservoir 2 to the stack 10 via the pump 9, and the water is electrolyzed into an oxygen gas ($O_2$) and a proton ($H^+$) by the action of catalyst on the oxygen side electrode in each cell. The proton is carried to the hydrogen side through the polymer membrane, and combined with an electron that reaches the hydrogen side electrode through an electric circuit to become a hydrogen gas ($H_2$).

At this time, it is the water contained in the polymer membrane that plays the role of carrying the proton to the hydrogen side in the polymer membrane. Therefore, for the water electrolysis, it is required that the polymer membrane is moisturized. On the other hand, mixture of the oxygen gas and water after electrolysis are routed to the reservoir 2 via the opened valve 8a. On the hydrogen side on the right hand of FIG. 1, each component corresponding to those on the oxygen side operates in a similar fashion to the oxygen side.

During a power generation time when the stack is used as a fuel cell, by opening the valve 5a after closing the valves 3 and 8a, the oxygen gas is blasted to the stack 10 via the check valve 5b. On the hydrogen side electrode, the hydrogen gas is separated into an electron and a proton by the action of catalyst, and the proton reaches the oxygen side through the polymer membrane. At this time, it is also the water contained in the polymer membrane that plays the role of carrying the proton to the hydrogen side in the polymer membrane.

On the oxygen side, the oxygen gas, the proton, and an electron that arrives through an electric circuit are reacted to form water. At this time, an excess oxygen gas which does not make a contribution to the reaction and water formed by the reaction are routed to the reservoir 2 through the opened valve 8b. In the reservoir 2, the oxygen gas and water are separated from each other, and the oxygen gas is routed back to the stack 10 via the pump 7 and the check valve 4. By the repetition of such a reaction, an electromotive force having a positive potential on the oxygen side and a negative potential on the hydrogen side of the cell is generated and the power generation is continued. During a power generation time, each component on the hydrogen side on the right hand of FIG. 1 also operates in a similar fashion to the corresponding each component on the oxygen side.

As can be seen from the above description, the reservoir 2 also serves as a gas-liquid separator for the oxygen gas and water, and the reservoir 2' also serves as a gas-liquid separator for the hydrogen gas and water.

As described above, during the power generation time, the polymer membrane is required to be moisturized by containing sufficient moisture in order to carry the proton that is separated from the electron to the oxygen side of the cell. In a conventional structure in which the oxygen gas is supplied only from the oxygen tank 1 and the hydrogen gas is supplied only from the hydrogen tank 1', the polymer membrane becomes dried and cannot hold the sufficient amount of moisture, so that it is necessary to externally supply moisture to the polymer membrane.

On the other hand, the embodiment illustrated in FIG. 1 is based on an operation with forming the entire fuel cell system as a closed one, so that the reservoirs 2 and 2' preliminarily contain liquid water which is utilized as the water to be supplied to the polymer membrane. In particular, a vapor pressure of the water is set to a predetermined value in the reservoir by controlling the temperature of the reservoirs 2 and 2' individually. To change the temperature, a heater may be used for the case of heating, and a cooling system may be used for the case of cooling. In particular, in an aerospace application, it is also possible to perform cooling by adiabatic expansion through a rapid pressure reduction of the reservoir utilizing a surrounding reduced-pressure environment.

The pressure gauges 6 and 6' may be used for setting a vapor pressure of the water. The water which is gasified based on the set vapor pressure in the respective reservoir is supplied to the stack 10 along with an oxygen gas from the reservoir 2, and with a hydrogen gas from the reservoir 2'. This configuration makes it possible to adjust the amount of water contained in the polymer membrane and maintain the appropriate moisturization of the polymer membrane without external water supply.

As can be seen from the above description, the water, the oxygen gas and the hydrogen gas which are required in the unitized regenerative fuel cell system in FIG. 1 are only provided by the oxygen gas and the hydrogen gas which are preliminarily contained in the oxygen tank 1 and the hydrogen tank 1', the predetermined pressure of oxygen gas and the predetermined amount of water which are preliminarily contained in the reservoir 2, and the predetermined pressure of hydrogen gas and the predetermined amount of water which are preliminarily contained in the reservoir 2'. This means that it is possible to continue the power storage and the power generation without externally supplying an oxygen gas, hydrogen gas and water. In this sense, the unitized regenerative fuel cell system in FIG. 1 may comprise a closed path (or an isolated path) which is completely closed.

In the prior fuel cell systems, those for terrestrial application have not so often been required to store and reuse the oxygen generated by water electrolysis because oxygen in the air can be utilized at least for the oxygen gas. However, there is a demand for reusing every resource in the case of considering a space application, and thus the closed cell system as in this embodiment is advantageous.

In the foregoing, description is made on the case of setting a vapor pressure of water by controlling a temperature of the reservoirs 2 and 2'. Alternatively, it may also be possible to provide, for example, a mechanism for varying a volume/temperature of the reservoirs 2 and 2', and set the amount of water vapor contained in the gas by controlling the volume or performing a temperature control through, for example, adiabatic expansion or compression. In addition to this, various techniques are known as a technique for setting a vapor pressure of water, which also reside within the technical scope of the present invention.

As described above, a thin ion-exchange membrane having a thickness of about 15 to 225 μm is often used as the polymer membrane. Thus, since the polymer membrane is very thin even in the case of using other types of membrane, it is likely to be broken when the difference in pressure (pressure difference) between both sides of the polymer membrane becomes large. If not be broken, when the pressure difference reaches about 50 kPa (about half the atmosphere pressure), molecules of the gas may pass from the higher pressure side to the lower pressure side. As a result, the hydrogen gas and the oxygen gas are mixed with each other to invoke a risk of explosion. For this reason, it is important to keep the pressure difference between both sides of the polymer membrane low.

As a technique of reducing the development of pressure difference placed on either side of the polymer membrane, an arrangement has been proposed in which a space between the components corresponding to the reservoirs 2 and 2' in FIG. 1 is connected by a communicating tube, and a bellows is provided in the middle of the communicating tube (see JP 2007-100204A). In this arrangement, when a difference in pressure develops between the components corresponding to the reservoirs 2 and 2', the bellows moves in response to the pressure to make the pressures on each side equal. However, when the bellows is damaged into a hole, for example, for some reasons, the hydrogen gas and the oxygen gas are still mixed with each other to pose a risk of explosion.

Thus, in this embodiment, a pressure difference gauge 11 is provided for measuring a pressure difference between the oxygen side and the hydrogen side of each cell, and when the pressure difference between the both sides exceeds a certain value, it keeps the pressure difference between the oxygen side and the hydrogen side below the certain value by performing a control of moving a position of liquid water level in the reservoirs 2 and 2' up and down. A concrete way of moving the position of liquid water level up and down includes, for example, connecting a reserve tank to each of the reservoirs 2, 2' via a valve, and controlling the opening and closing of the valve based on the result of measurement of the pressure difference gauge 11 to move the or liquid water level of the reservoirs 2, 2' up and down, thereby to make the pressure difference between the both sides of the polymer membrane to fall within a predetermined range. In this way, since there is almost no possibility for the oxygen gas and the hydrogen gas to be mixed with each other at a portion connecting the reservoirs 2 and 2', the risk of explosion can be avoided. As an another way, it is also possible to make the pressure difference between the both sides of the polymer membrane to fall within a predetermined range by changing a pressure on one or both of the oxygen gas in the reservoir 2 or the hydrogen gas in the reservoir 2' based on the result of measurement of the pressure difference gauge 11. For this pressure difference control, it is also possible to use a measured value of the pressure gauge installed in the reservoir 2 or 2' and move the liquid water level so that the difference of the measured value falls within a defined difference in pressure.

Further, it may also be possible to perform the liquid water level control as described above by utilizing a result of measurement of the pressure gauges 6 and 6' instead of providing the pressure difference gauge, or to provide a pressure gauge on another portion of the oxygen gas passage or the hydrogen gas passage, and perform the liquid water level control as described above based on the result of measurement thereof. Furthermore, it is also possible to provide both of the pressure difference gauge and the pressure gauge.

The Applicant has proposed, in JP 4013218B, a fuel cell system which enables an efficient power generation by making a direction of flow of the oxygen gas and the hydrogen gas blasted to either side of the polymer membrane to be an "counter flow" in which the both gas flow in a opposite direction to each other. According to this fuel cell system, it is contemplated that water generated on the oxygen side of the polymer membrane sufficiently penetrates into the polymer membrane, and efficiency of acquiring a proton from the hydrogen gas flowing in the opposite direction to the oxygen gas on the hydrogen side is improved, making the proton more prone to reach the oxygen side.

On the other hand, in this embodiment, it is possible to maintain the entire system in a moisturized state by controlling it as a closed one, and in addition, to provide an appropriate humidity to the oxygen gas and the hydrogen gas supplied from the reservoirs 2 and 2' and supply the moisture to the polymer membrane by appropriately controlling the vapor pressure of the water contained in the reservoirs 2 and 2' as described above. This allows the sufficient water to be supplied to the polymer membrane, enabling a proper operation as a fuel cell without depending on the way to flow of the gas including the case of "parallel flow" of the oxygen gas and the hydrogen gas where the both gases are directed in the same direction instead of the counter flow as described above.

Figure 2:
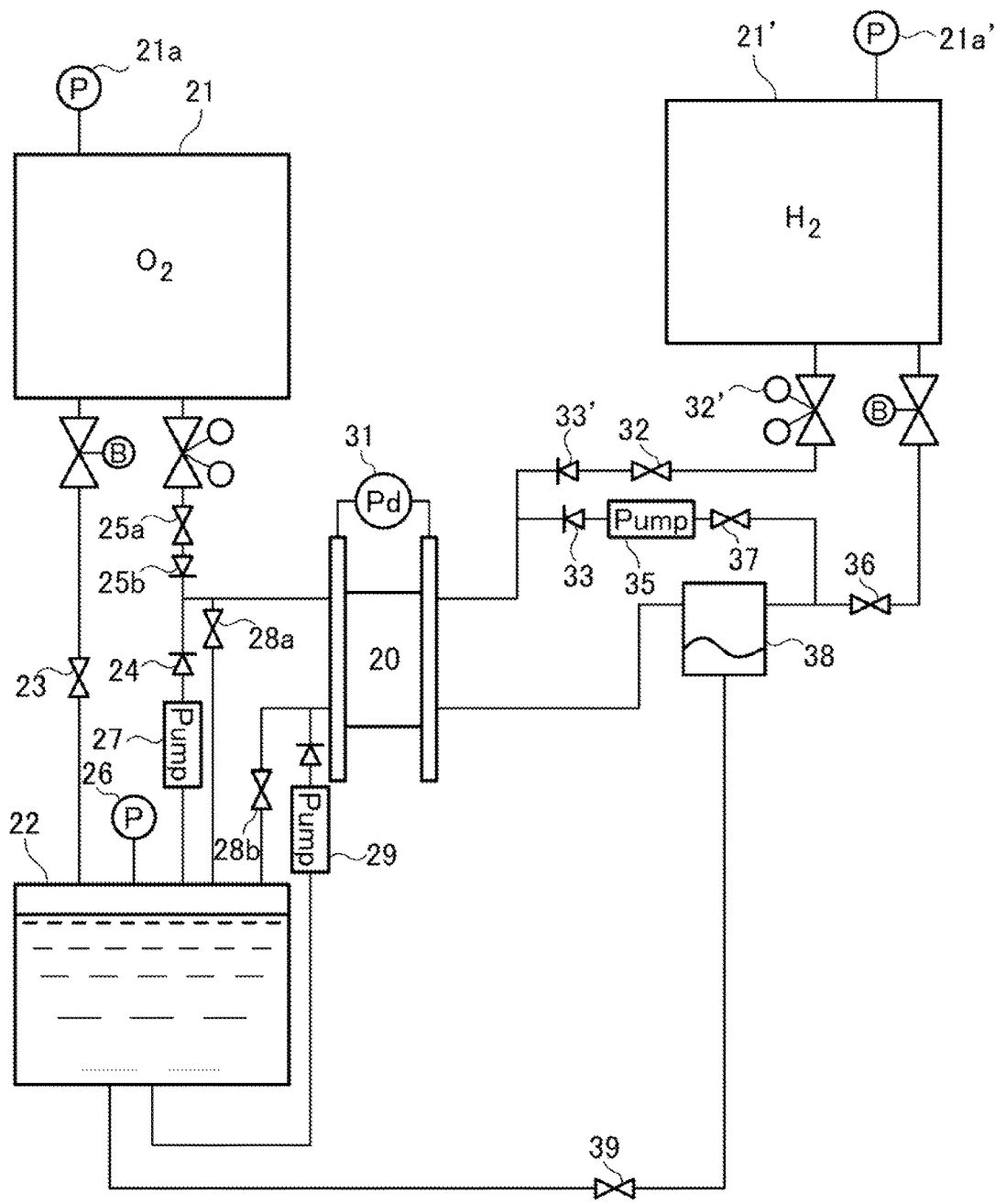
FIG. 2 illustrates a structure of a regenerative fuel cell system according to a second embodiment of the present invention.

FIG. 2 illustrates a schematic structure of a unitized regenerative fuel cell system according to a second embodiment of the present invention. Also in FIG. 2, only the lines for gas and liquid are illustrated, and electrical circuits such as a load are omitted.

The numeral 20 in FIG. 2 designates a stack of the unitized regenerative fuel cell system, the structure and operation of which is the same as the stack in FIG. 1, so that the detailed description thereof is omitted. As to the other components in FIG. 2, like symbols refer to the similar ones to FIG. 1.

In FIG. 2, each of the numerals 21, 21' and 22 designates an oxygen tank, a hydrogen tank, a reservoir, respectively. The reservoir 22 corresponds to the oxygen side reservoir 2 of the first embodiment, and the hydrogen side reservoir is not provided. Each of the numerals 21*a*, 21*a*' and 26 designates a pressure gauge for measuring a pressure of gas in the respective tank or reservoir. Each of the numerals 27, 29 and 35 designates a pump for circulating the gas or water corresponding to the respective tank or reservoir. The numeral 31 designates a pressure difference gauge for measuring a difference in pressure (pressure difference) between the oxygen side and the hydrogen side, and the numeral 38 designates a gas-liquid separator provided on the hydrogen side. Each of the oxygen tank 21 and the hydrogen tank 21' preliminarily contains a predetermined pressure of oxygen gas and hydrogen gas, respectively. The reservoir 22 preliminarily contains a predetermined pressure of oxygen gas and a predetermined amount of water (liquid).

Unlike the system of the first embodiment, the system of the second embodiment illustrated in FIG. 2 comprises a gas-liquid separator 38 provided on the hydrogen side. The gas-liquid separator 38 is a dedicated device for separating gas and liquid, and has a very small volume as compared to the reservoirs 2 and 2' of the first embodiment which also serve as a gas-liquid separator.

At the time of water electrolysis (power storage), water is supplied from the reservoir 22 to the stack 20 via the pump 29, where it is electrolyzed into an oxygen gas, a proton and an electron. The proton generated as a result of the electrolysis is transferred to the hydrogen side through the polymer membrane by the action of water in the polymer membrane. The mixture of the oxygen gas and water generated as a result of the electrolysis is routed to the reservoir 22 via the opened valve 28*a*. In the reservoir 22, the oxygen gas and the water become separated. The oxygen gas is stored in the oxygen tank 21 via the opened valve 23.

On the other hand, on the hydrogen side electrode, a hydrogen gas is generated by the proton and the electron. The hydrogen generated in the stack 20 is routed to the gas-liquid separator 38 in a moisturized state, where the hydrogen gas and the water become separated. The separated hydrogen gas is routed to the hydrogen tank 21' via the valve 36. In the event of storage of water in the gas-liquid separator 38, it may be appropriately routed back to the reservoir 22 by opening the valve 39.

During a power generation time when the stack is used as a fuel cell, by opening the valve 25*a* after closing the valves 23 and 28*a*, the oxygen gas is blasted to the oxygen side electrode of the stack 20 via the check valve 25*b*. On the hydrogen side electrode, the hydrogen gas is separated into an electron and a proton by an action of catalyst, and the proton reaches the oxygen side through the polymer membrane. At this time, it is also the water contained in the polymer membrane that plays the role of carrying the proton to the hydrogen side.

On the oxygen side, the oxygen gas, the proton, and an electron that arrives through an electric circuit are reacted to form water. At this time, an excess oxygen gas which does not make a contribution to the reaction and water formed by the reaction are sent to the reservoir 22 through the opened valve 28*b*. In the reservoir 22, the oxygen gas and water are separated from each other, and the oxygen gas is routed back to the stack 20 via the pump 27 and the check valve 24. By the repetition of such a reaction, an electromotive force having a positive potential on the oxygen side and a negative potential on the hydrogen side of the cell is generated and the power generation is continued.

On the hydrogen side, by closing the valve 36, opening the valve 37 and further opening the valve 32, the hydrogen gas is supplied from the hydrogen tank 21' to the stack 20 via the check valve 33'. The unreacted hydrogen gas containing moisture is routed to the gas-liquid separator 38, where it is subjected to a moisture removal, and then pressurized by the pump 35 and supplied again to the stack 20 via the check valve 33.

In the second embodiment illustrated in FIG. 2, the reservoir 22 contains liquid water, which is supplied as water for moisturizing the polymer membrane during the power generation time. In particular, a vapor pressure of the water is set to a predetermined value in the reservoir 22 by controlling the temperature of the reservoir 22. As with the case of the first embodiment, various techniques can be used as follows: to change the temperature, a heater may be used for the case of heating, and a cooling system may be used for the case of cooling; in particular, in an aerospace application etc., temperature attenuation by adiabatic expansion through a rapid pressure reduction by utilizing a surrounding reduced-pressure environment can be expected; and the like. As with the case of the first embodiment, this configuration makes it possible to adjust the amount of water contained in the polymer membrane and to maintain the appropriate moisturization of the polymer membrane with no supply of external water.

As can be seen from the above description, the water, the oxygen gas and the hydrogen gas which are required in the unitized regenerative fuel cell system in FIG. 2 are only provided by the oxygen gas and the hydrogen gas which are preliminarily contained in the oxygen tank 21 and the hydrogen tank 21', and the predetermined pressure of oxygen gas and the predetermined amount of water which are preliminarily contained in the reservoir 22. This means that the continuous operation is possible even without externally supplying an oxygen gas, hydrogen gas and water. In this sense, the unitized regenerative fuel cell system in FIG. 2 may also comprise a closed path or an isolated path which is completely closed, as with the case of the first embodiment.

In the foregoing, description is made on the case of setting a vapor pressure of water by controlling a temperature of the reservoir 22. Alternatively, as with the case of the first embodiment, it may also be possible to provide, for example, a mechanism for varying a volume/temperature of the reservoir 22, and set the vapor pressure of water by controlling the volume or performing a temperature control through, for example, adiabatic expansion or compression, or otherwise.

In addition, in this embodiment, as a technique of keep the pressure difference between both sides of the polymer membrane low, a pressure difference gauge 31 is provided for measuring a pressure difference between the oxygen side and the hydrogen side of each cell, and when the pressure difference between the both sides exceeds a certain value, it keeps the pressure difference between the oxygen side and the hydrogen side below the certain value by performing a control of moving a position of liquid water level in the reservoir 22 up and down. As with the case of the first embodiment, a reserve tank is connected to the reservoir 22 via a valve, and the opening and closing of the valve is controlled based on the result of measurement of the pressure difference gauge 31 to move the liquid water level of the reservoirs 22 up and down, thereby to make the pressure difference between the both sides of the polymer membrane to fall within a predetermined range. For this pressure difference control, it is also possible to use a measured value of the pressure gauge installed in the reservoir 22 and a measured value of the pressure in the gas-liquid separator 38, and move the liquid water level so that the difference between these values falls within a defined difference in pressure.

Further, also in this embodiment, it is possible to provide an appropriate humidity to the oxygen gas and the hydrogen gas supplied from the reservoir 22, and to supply the moisture to the polymer membrane by appropriately controlling the vapor pressure of the water contained in the reservoir 22 as described above. It is noted that the gas-liquid separator 38 can also be used for the control of temperature and pressure difference by temperature control/liquid water level control etc., as the reservoir 22. As with the case of the first embodiment, this embodiment also allows the sufficient water to be supplied to the polymer membrane, enabling a proper operation as a fuel cell without depending on the way to flow of the gas including the case of "parallel flow" of the oxygen gas and the hydrogen gas where the both gases are directed in the same direction instead of the counter flow as described above. Further, although the above structure comprises a gas-liquid separator 38, the gas-liquid separator 38 is not necessarily required in the case where it is possible to maintain the polymer membrane of the cell always in a moisturized state by making good use of the water passage on the oxygen side, and to optimally maintain the circulating volume on the oxygen side while performing a control thereof and no excess water is generated on the hydrogen side.

Figure 3:
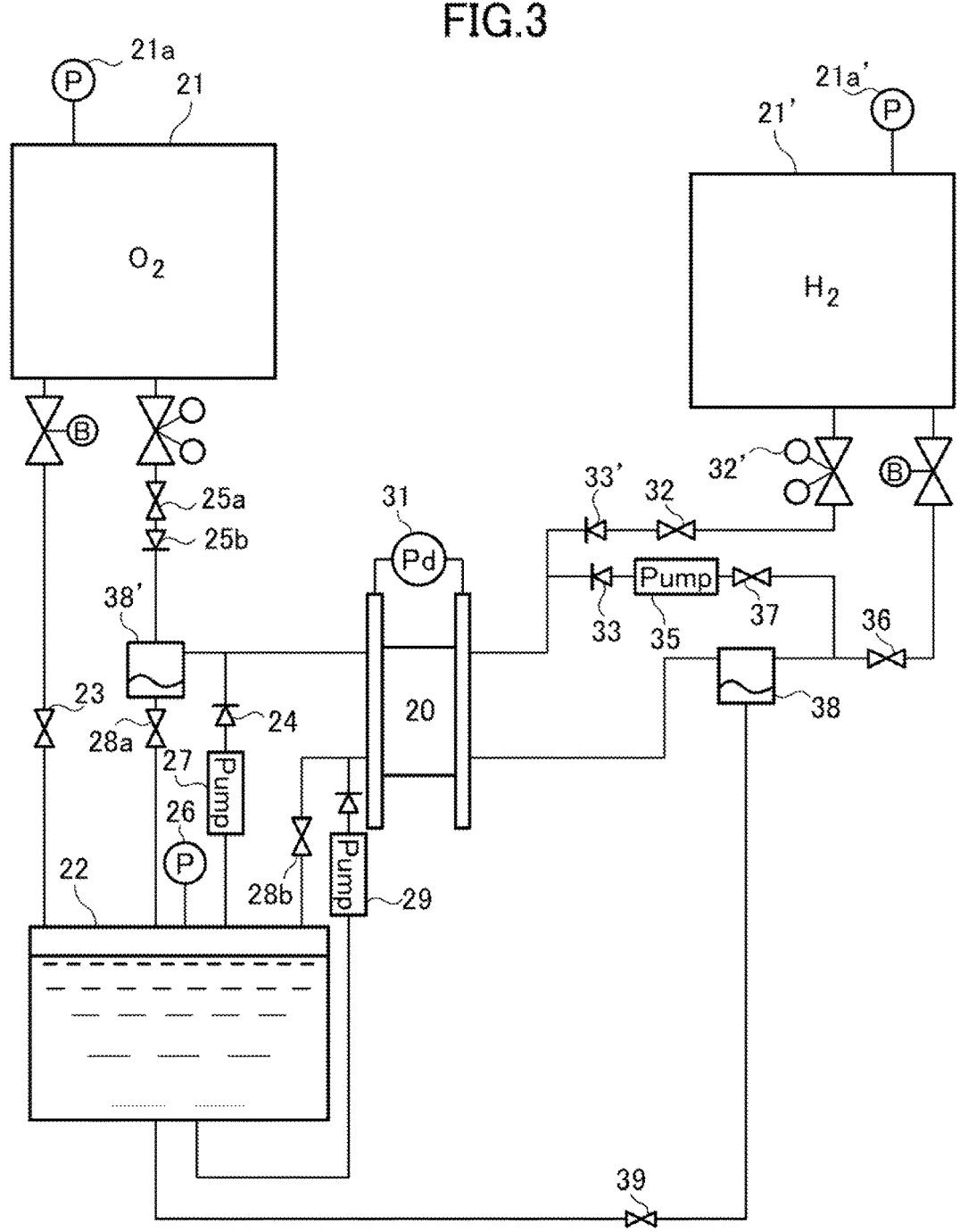
FIG. 3 illustrates a structure of a regenerative fuel cell system according to a third embodiment of the present invention.
Figure 4:
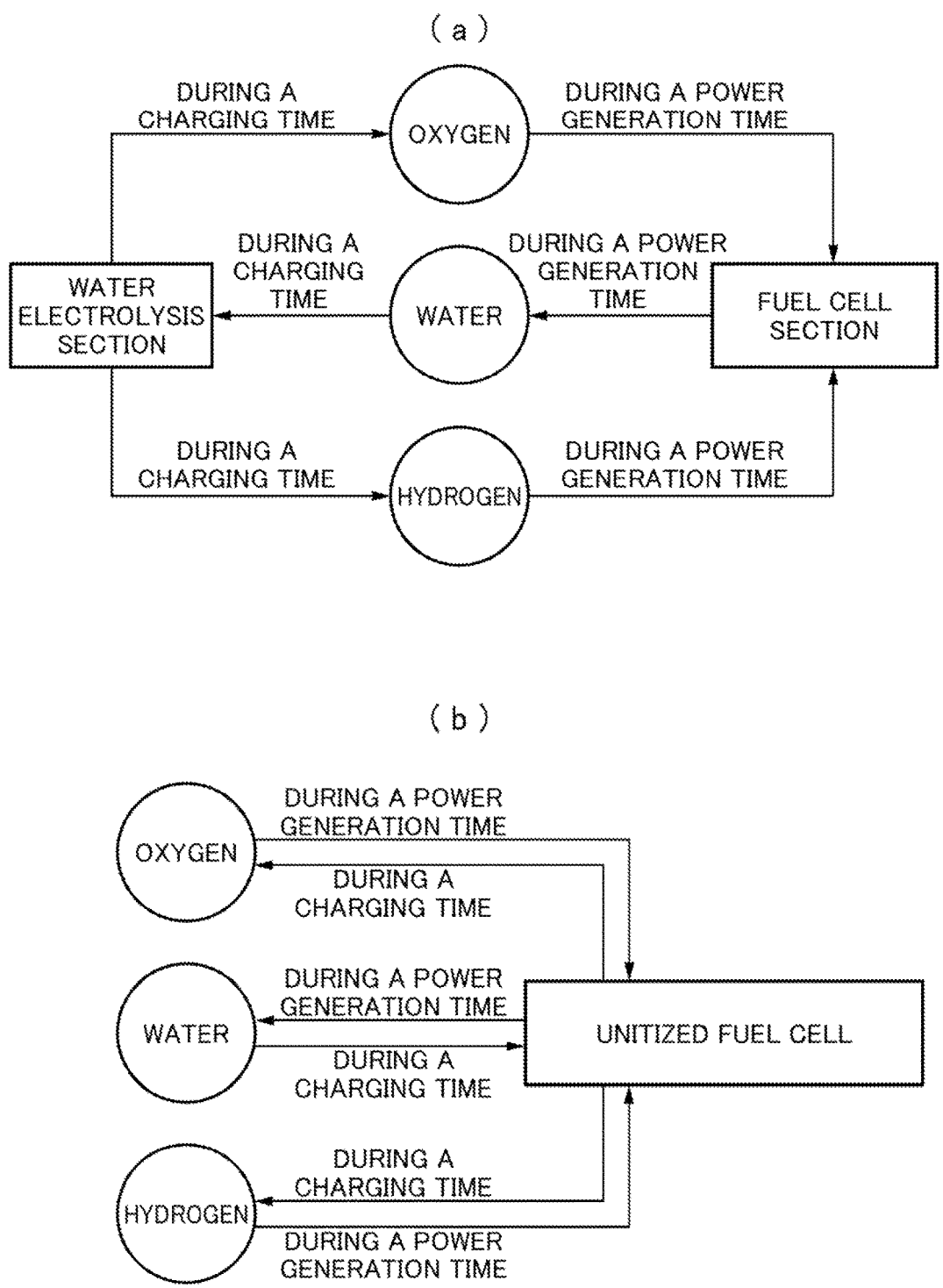
FIG. 4 is an illustration for explaining a power generation mechanism and charging (power storage) mechanism of a regenerative fuel cell system using hydrogen and oxygen.

FIG. 3 illustrates a schematic structure of a unitized regenerative fuel cell system according to a third embodiment of the present invention, which is a variation of the second embodiment illustrated in FIG. 2. The third embodiment differs from the second embodiment in that it comprises a gas-liquid separator 38' having the same function as the gas-liquid separator 38 provided also on the oxygen side. By providing the gas-liquid separator 38' on the oxygen side, it also becomes possible to perform gas-liquid separation in the gas-liquid separator 38, while using the reservoir 22 for higher accuracy control of humidity and pressure difference by temperature control/liquid water level control etc.

In any of the above first to third embodiments, the stack is described as a unitized type. However, it will readily be understood by those having ordinary skill in the art that the characteristics of the present invention may also be applied to a separate type in which a fuel cell section and a water electrolysis section are provided in a separated manner, wherein the characteristics include forming the entire system as a closed one and maintaining the inside of the system in a moisturized environment, while controlling a vapor pressure of water in the reservoir to supply water to the polymer membrane, and measuring a difference in pressure between an oxygen side and a hydrogen side of the polymer membrane of the cell and controlling a position of the liquid water level based on the difference in pressure to keep the pressure difference within a predetermined range.

What is claimed is:

1. A regenerative fuel cell system comprising a combination of a fuel cell and a water electrolyzer comprising a polymer membrane and electrodes each provided on either side of the polymer membrane,
   wherein the regenerative fuel cell system is operable to generate electric power during a power generation time by supplying an oxygen gas to an electrode provided on one side of the polymer membrane and by supplying a hydrogen gas to an electrode provided on the other side of the polymer membrane, and to generate an oxygen gas and a hydrogen gas during a charging time by electrolyzing water in the combination of the fuel cell and the water electrolyzer, the regenerative fuel cell system comprising:
   an oxygen tank for storing an oxygen gas;
   a hydrogen tank for storing a hydrogen gas;
   a first reservoir for storing water and an oxygen gas that is not used for power generation out of the oxygen gas supplied during the power generation time;
   a second reservoir for storing water and a hydrogen gas that is not used for power generation out of the hydrogen gas supplied during the power generation time; and
   vapor pressure control means for controlling a vapor pressure of the water in at least one of the first reservoir and the second reservoir,
   wherein the combination of the fuel cell and the water electrolyzer, the oxygen tank, the hydrogen tank, the first reservoir, the second reservoir, and a liquid/gas path for connecting them are provided as a closed path, the oxygen tank and the first reservoir are connected with each other to allow the oxygen gas to travel back and forth therebetween, the regenerative fuel cell system is operable to supply the oxygen gas to the electrode provided on one side of the polymer membrane during the power generation time, the hydrogen tank and the second reservoir are connected with each other to allow the hydrogen gas to travel back and forth therebetween, and the regenerative fuel cell system is operable to supply the hydrogen gas to the electrode provided on the other side of the polymer membrane during the power generation time,
   wherein the regenerative fuel cell system is operable to supply water, which is required during the power generation time, to the polymer membrane by controlling the vapor pressure of the water by the vapor pressure control means,
   wherein the regenerative fuel cell system comprises a pressure difference gauge that is operable for measuring a pressure difference between the oxygen gas on an oxygen side and the hydrogen gas on a hydrogen side of the polymer membrane, and the pressure difference is controllable within a predetermined range by varying at least one of a position of liquid water level in the first reservoir and a position of liquid water level in the second reservoir, or by varying at least one of an oxygen gas pressure in the first reservoir and a hydrogen gas pressure in the second reservoir, based on the result of the measurement, and wherein the pressure difference gauge is disposed between the oxygen side and the hydrogen side of the polymer membrane.

2. The regenerative fuel cell system as defined in claim 1, wherein the vapor pressure control means is operable to control the vapor pressure of the water by varying a temperature of the first reservoir and the second reservoir.

3. The regenerative fuel cell system as defined in claim 1, wherein the regenerative fuel cell system comprises a first pressure gauge that is operable for measuring a pressure of the oxygen gas in the first reservoir or in a passage on an oxygen side and a second pressure gauge that is operable for measuring a pressure of the hydrogen gas in the second reservoir or in a passage on a hydrogen side, and the pressure difference between the oxygen gas on the oxygen side and the hydrogen gas on the hydrogen side is controllable within the predetermined range by varying at least one of the position of liquid water level in the first reservoir and the position of liquid water level in the second reservoir, based on the measured values of the first and second pressure gauges.

4. The regenerative fuel cell system as defined in claim 1, wherein the combination of the fuel cell and the water electrolyzer is formed by providing a fuel cell section and a water electrolysis section in an integrated manner.

5. The regenerative fuel cell system as defined in claim 1, wherein the combination of the fuel cell and the water electrolyzer is formed by providing a fuel cell section and a water electrolysis section in a separated manner.

6. A regenerative fuel cell system comprising a combination of a fuel cell and a water electrolyzer comprising a polymer membrane and electrodes each provided on either side of the polymer membrane, wherein the regenerative fuel cell system is operable to generate electric power during a power generation time by supplying an oxygen gas to an electrode provided on one side of the polymer membrane and by supplying a hydrogen gas to an electrode provided on the other side of the polymer membrane, and to generate an oxygen gas and a hydrogen gas during a charging time by electrolyzing water in the combination of the fuel cell and the water electrolyzer, the regenerative fuel cell system comprising:

an oxygen tank for storing an oxygen gas;
a hydrogen tank for storing a hydrogen gas;
a reservoir for storing water and an oxygen gas that is not used for power generation out of the oxygen gas supplied during the power generation time; and
vapor pressure control means for controlling a vapor pressure of the water in the reservoir,
wherein the combination of the fuel cell and the water electrolyzer, the oxygen tank, the hydrogen tank, the reservoir, and a liquid/gas path for connecting them are provided as a closed path, the oxygen tank and the reservoir are connected with each other to allow the oxygen gas to travel back and forth therebetween, and the regenerative fuel cell system is operable to supply the oxygen gas to the electrode provided on one side of the polymer membrane, while the hydrogen gas is supplied from the hydrogen tank to the electrode provided on the other side of the polymer membrane during the power generation time, wherein the regenerative fuel cell system is operable to supply water, which is required during the power generation time, to the polymer membrane by controlling the vapor pressure of the water by the vapor pressure control means, wherein the regenerative fuel cell system comprises a pressure difference gauge that is operable for measuring a pressure difference between the oxygen gas on an oxygen side and the hydrogen gas on a hydrogen side of the polymer membrane, and the pressure difference is controllable within a predetermined range by varying a position of liquid water level in the reservoir based on the result of the measurement, or by varying a pressure of the oxygen gas in the reservoir based on the result of the measurement, and wherein the pressure difference gauge is disposed between the oxygen side and the hydrogen side of the polymer membrane.

7. The regenerative fuel cell system as defined in claim 6, wherein the regenerative fuel cell system further comprises a gas-liquid separator that is operable for separating water and a hydrogen gas that is not used for power generation out of the hydrogen gas supplied during the power generation time, and operable for supplying the separated hydrogen gas to the hydrogen tank, wherein the gas-liquid separator is incorporated in the closed path.

8. The regenerative fuel cell system as defined in claim 7, wherein the regenerative fuel cell system further comprises an oxygen side gas-liquid separator that is operable for separating water and an oxygen gas that is not used for power generation out of the oxygen gas supplied during the power generation time, wherein the oxygen side gas-liquid separator is incorporated in the closed path.

9. The regenerative fuel cell system as defined in claim 7, wherein the regenerative fuel cell system comprises a first pressure gauge that is operable for measuring a pressure of the oxygen gas in the reservoir or in a passage on an oxygen side and a second pressure gauge that is operable for measuring a pressure of the hydrogen gas in the gas-liquid separator or in a passage on a hydrogen side, and the pressure difference between the oxygen gas on the oxygen side and the hydrogen gas on the hydrogen side is controllable within the predetermined range by varying the position of liquid water level in the reservoir based on the measured values of the first and second pressure gauges.

10. The regenerative fuel cell system as defined in claim 6, wherein the vapor pressure control means is operable to control the vapor pressure of the water by varying a temperature of the reservoir.

11. The regenerative fuel cell system as defined in claim 6, wherein the combination of the fuel cell and the water electrolyzer is formed by providing a fuel cell section and a water electrolysis section in an integrated manner.

12. The regenerative fuel cell system as defined in claim 6, wherein the combination of the fuel cell and the water electrolyzer is formed by providing a fuel cell section and a water electrolysis section in a separated manner.

* * * * *